(12) United States Patent
Gopalakrishnan et al.

(10) Patent No.: US 10,193,780 B2
(45) Date of Patent: Jan. 29, 2019

(54) SYSTEM AND METHOD FOR ANOMALY ROOT CAUSE ANALYSIS

(71) Applicant: Futurewei Technologies, Inc., Plano, TX (US)

(72) Inventors: Nandu Gopalakrishnan, Chatham, NJ (US); Yirui Hu, Piscataway, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 335 days.

(21) Appl. No.: 14/879,778

(22) Filed: Oct. 9, 2015

(65) Prior Publication Data
US 2017/0104657 A1 Apr. 13, 2017

(51) Int. Cl.
*H04L 12/26* (2006.01)
*G06K 9/62* (2006.01)
*H04L 12/24* (2006.01)

(52) U.S. Cl.
CPC .......... *H04L 43/0876* (2013.01); *G06K 9/622* (2013.01); *G06K 9/6215* (2013.01); *G06K 9/6219* (2013.01); *G06K 9/6247* (2013.01); *G06K 9/6284* (2013.01); *H04L 41/0631* (2013.01); *H04L 41/16* (2013.01); *H04L 43/08* (2013.01); *H04L 43/04* (2013.01); *H04L 43/0888* (2013.01)

(58) Field of Classification Search
CPC ... H04L 43/0876; H04L 43/04; G06K 9/6284; G06K 9/6215
See application file for complete search history.

(56) References Cited

U.S. PATENT DOCUMENTS

| 2007/0028219 | A1 | 2/2007 | Miller et al. |
| 2012/0041575 | A1 | 2/2012 | Maeda et al. |
| 2013/0198565 | A1* | 8/2013 | Mancoridis ........... G06F 11/008 714/26 |
| 2014/0039834 | A1 | 2/2014 | Shibuya et al. |
| 2016/0261468 | A1* | 9/2016 | Premkumar ............ H04L 41/16 |
| 2017/0265089 | A1* | 9/2017 | Sanneck ................ H04W 24/02 |
| 2017/0346705 | A1* | 11/2017 | Szilagyi .............. H04L 41/5067 |

FOREIGN PATENT DOCUMENTS

| CN | 102282516 A | 12/2011 |
| WO | 2007002838 A2 | 1/2007 |

OTHER PUBLICATIONS

Aggarwal, C.C., "Outlier Analysis," Kluwer Academic Publishers, ©Springer Science+Business Media New York 2013, 98 pages.

* cited by examiner

Primary Examiner — Changhyun Yi
(74) Attorney, Agent, or Firm — Slater Matsil, LLP

(57) ABSTRACT

A method includes receiving an anomaly data point and comparing the anomaly data point to a magnitude bounding box to produce a first comparison. The method also includes comparing the anomaly data point to a principal component analysis (PCA) bounding box to produce a second comparison and classifying the anomaly data point in accordance with the first comparison and the second comparison to produce a classification.

18 Claims, 14 Drawing Sheets

SYSTEM AND METHOD FOR ANOMALY ROOT CAUSE ANALYSIS

TECHNICAL FIELD

The present invention relates to a system and method for anomaly analysis, and, in particular, to a system and method for anomaly root cause analysis.

BACKGROUND

In anomaly analysis, it is desirable to explain detected anomalies. In anomaly detection, items, events, or observations which do not conform to an expected pattern or other items in the data set are detected as anomalies. Anomaly data points often translate into a problem. Root cause analysis (RCA) is a method of problem solving which attempts to identify the root cause of faults or problems. Explanations of anomalies may be used to correct or solve problems or to plan to account for the problems. Anomaly detection may be used to identify potential issues in a wireless network.

SUMMARY

An embodiment method includes receiving an anomaly data point and comparing the anomaly data point to a magnitude bounding box to produce a first comparison. The method also includes comparing the anomaly data point to a principal component analysis (PCA) bounding box to produce a second comparison and classifying the anomaly data point in accordance with the first comparison and the second comparison to produce a classification.

An embodiment method includes receiving a data set, where the data set includes a plurality of normal data points and a plurality of anomaly data points and constructing a magnitude bounding box in accordance with the data set. The method also includes constructing a principal component analysis (PCA) bounding box in accordance with the data set.

An embodiment computer includes a processor and a non-transitory computer readable storage medium storing programming for execution by the processor. The programming includes instructions to receive an anomaly data point and compare the anomaly data point to a magnitude bounding box to produce a first comparison. The programming also includes instructions to compare the anomaly data point to a principal component analysis (PCA) bounding box to produce a second comparison and classify the anomaly data point in accordance with the first comparison and the second comparison to produce a classification.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
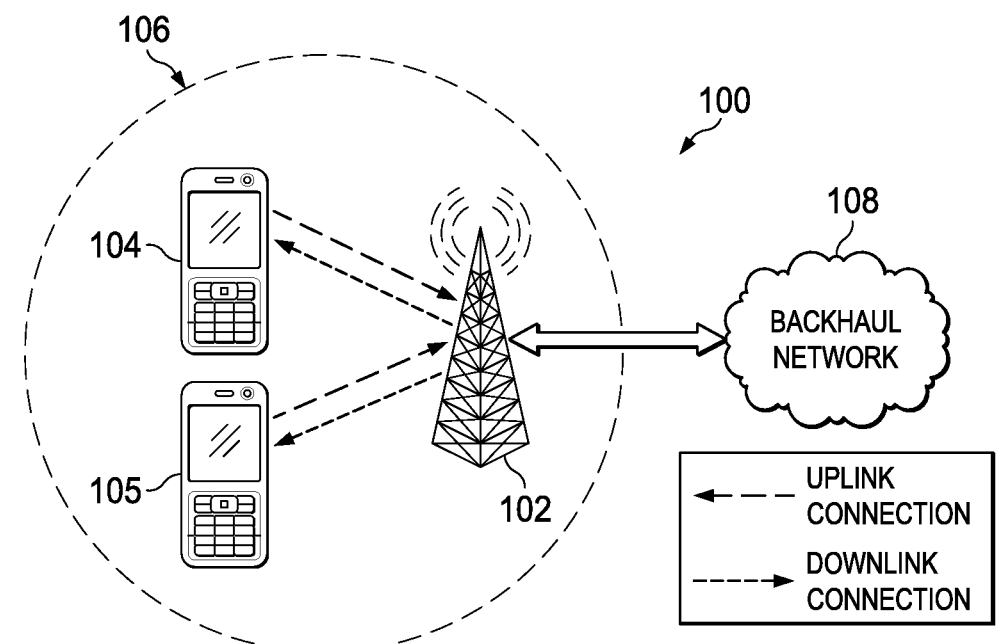
FIG. 1 illustrates a diagram of a wireless network for communicating data.

FIG. 1 illustrates network 100 for communicating data. Network 100 includes communications controller 102 having a coverage area 106, a plurality of user equipments (UEs), including UE 104 and UE 105, and backhaul network 108. Two UEs are depicted, but many more may be present. Communications controller 102 may be any component capable of providing wireless access by establishing uplink (dashed line) and/or downlink (dotted line) connections with UE 104 and UE 105, such as a base station, a NodeB, an enhanced nodeB (eNB), an access point, a picocell, a femtocell, relay node, and other wirelessly enabled devices. UE 104 and UE 105 may be any component capable of establishing a wireless connection with communications controller 102, such as cell phones, smart phones, tablets, sensors, etc. Backhaul network 108 may be any component or collection of components that allow data to be exchanged between communications controller 102 and a remote end. In some embodiments, the network 100 may include various other wireless devices, such as relays, etc. In one example, network 100 is a self-organizing network (SON).

Cellular networks, such as network 100, may experience a wide variety of anomalies. It is desirable to determine information about the cause of an anomaly in a cellular network to address the anomaly. Anomalies may occur within a multi-dimensional set of data or metrics, such as key performance indicators (KPIs), traffic and resource counters, and measurement reports. Additionally, anomalies may occur from a variety of behavior, performance, or node breakdown reasons. Anomalies may be caused by unusual traffic increase or decrease, such as short term spurts or medium or long term seasonal congestion. Also, poorly configured or poorly optimized parameters may lead to anomalies from occasional poor performance of the network. Additionally, the addition of new terminals with different consumption characteristics may lead to anomalies. In another example, network outages, such as sleeping cells, where the cells are on but not functioning correctly, may lead to anomalies. Disaster events, such as hurricanes or earthquakes, may also lead to anomalies in a network. Additionally, hardware or software bugs in network nodes, for example due to upgrades, may lead to anomalies. Also, network intrusions or adversarial attacks, such as viruses or malware, may cause anomalies in networks.

In an embodiment a category of anomaly is determined, without necessarily determining a specific cause of an anomaly. Anomalies may be based on the magnitude of an individual variable or a joint subset of variables. For example, an anomaly may be detected based on subtle changes in the relationship between parameters, where there is an unusual combination of variables, without any single variable having an extreme magnitude. An embodiment determines which variable(s) are related to the anomaly.

A machine learning model may be used to detect anomalies, which may be manifest as unusual or unlikely data points or patterns. Examples of anomaly detection include density based techniques, subspace and correlation based outlier detection for high-dimensional data, one class support vector machines, replicator neural networks, cluster analysis based outlier detection, deviations from association rules and frequent itemsets, fuzzy logic based outlier detection, ensemble techniques using feature bagging, score normalization, and different sources of diversity.

An embodiment determines a class of anomaly based on a detected anomaly. For example, an anomaly may be an extreme magnitude of a variable or a subtle change in the relationship within a subset of variables for a joint anomaly. Also, an embodiment determines which variable or variable combination in a multi-dimensional variable set was involved in the detected anomaly. Based on the position of a given anomaly data point relative to normal data points and anomaly data points, the cluster or hidden mode of data to which the anomaly is likely associated with may be determined. A set of data may include multiple clusters, which may each be normal. For example, different clusters may represent different seasons, different times of day, or different days of the week. To place an anomaly data point in a cluster, a likelihood score may be determined, where the likelihood score is low far from the cluster and high close to the cluster. An anomaly may be detected to be an extreme atypical magnitude of one of the component variables, a relationship breakdown between some of the component variables, or a combination of an atypical magnitude and a relationship breakdown. Many variables, for example 300 or more, may be used in an embodiment joint detection method.

Figure 2:
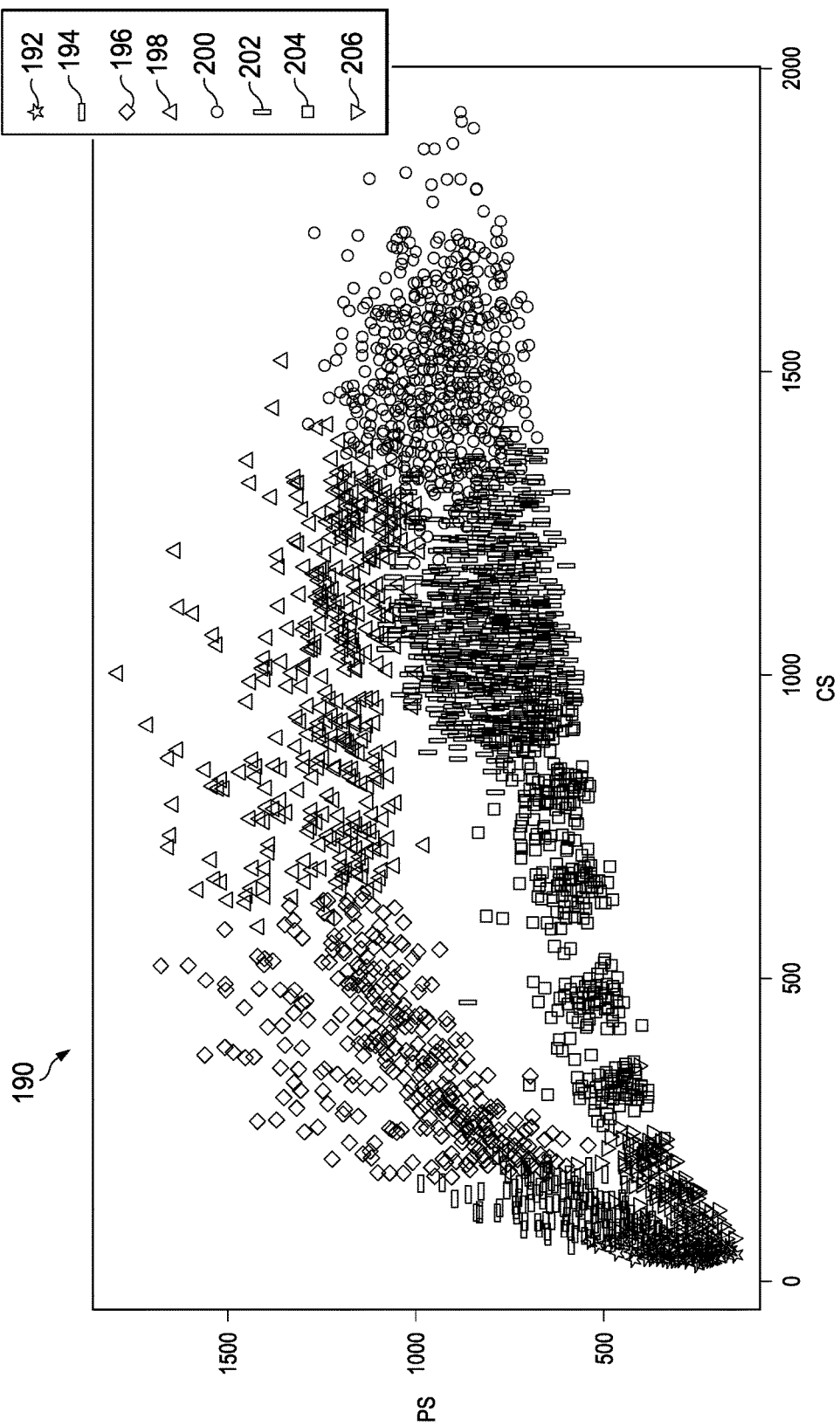
FIG. 2 illustrates an example two-dimensional data point distribution.

FIG. 2 illustrates data distribution 190, an example two-dimensional data distribution which contains eight clusters, clusters 192, 194, 196, 198, 200, 202, 204, and 206. Data distribution 190 depicts data for a radio network controller (RNC), where the data in data distribution 190 is retrieved from an RNC. Data distribution 190 depicts circuit switched (CS) values for the amount of voice traffic and packet switched (PS) values for the number of packets in a network. Table 1 below shows group probabilistic latent semantic analysis (GPLSA) for the data, where K is the number of clusters. The data distribution is divided into eight clusters, where each data point is placed into one of the clusters.

TABLE 1

| K | Training GPLSA | Testing GPLSA | 95% GPLSA |
|---|---|---|---|
| 2 | −13.44 | −13.0 | −21.48 |
| 4 | −12.57 | −12.46 | −18.71 |
| 6 | −11.95 | −11.81 | −19.36 |
| 7 | −11.83 | −11.66 | −18.71 |
| 8 | −11.65 | −11.48 | −18.77 |
| 9 | −11.49 | −11.30 | −18.97 |

Figure 3:
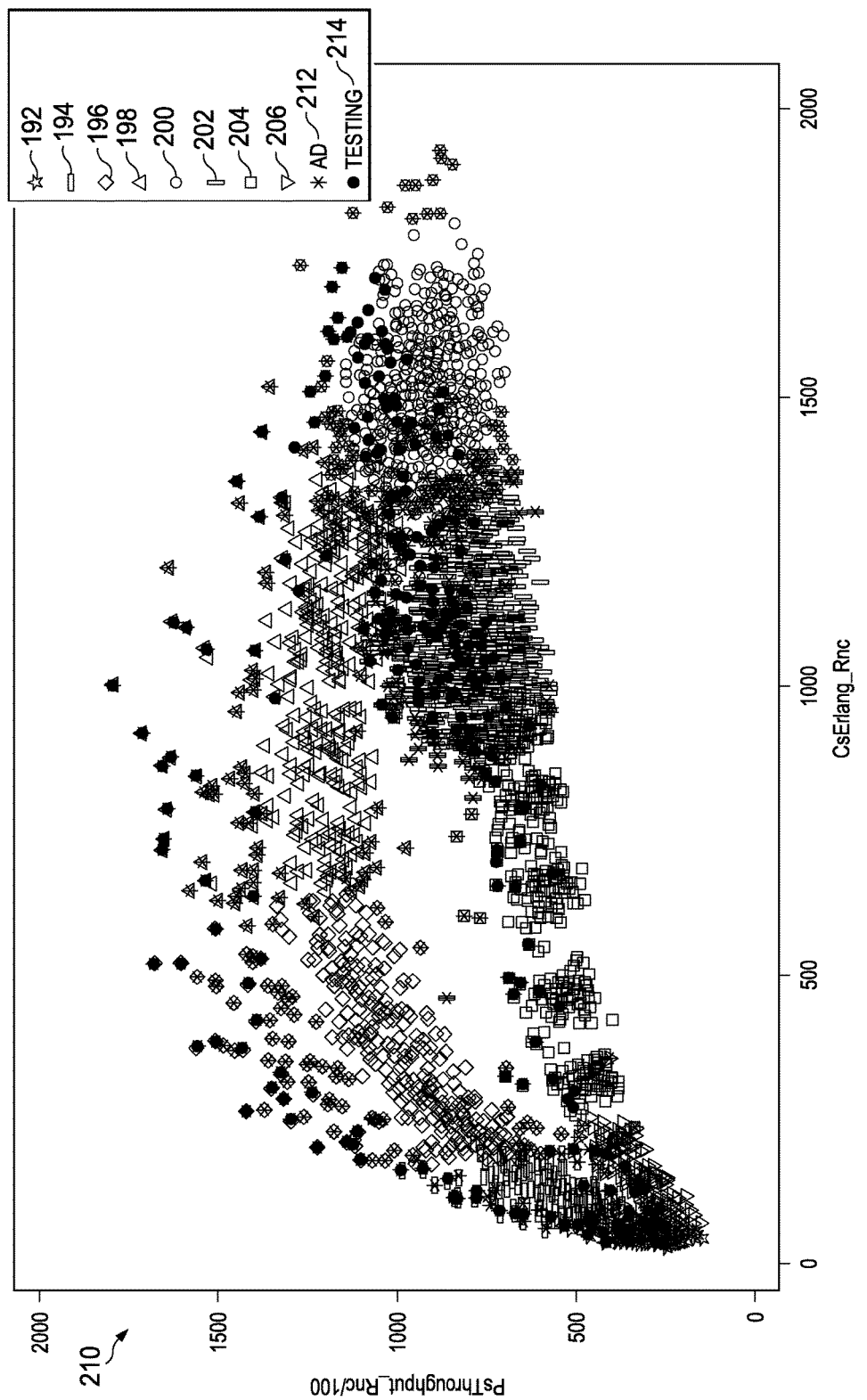
FIG. 3 illustrates an example two-dimensional data point distribution with anomaly data points.

FIG. 3 illustrates data distribution 210, with eight clusters, which includes testing and anomaly detections. Data points 214 are testing points, and data points 212 are anomalies detected (AD). The x axis shows the CS Erlang for the RNC, while the y axis shows the PS throughput for RNC.

Figure 4:
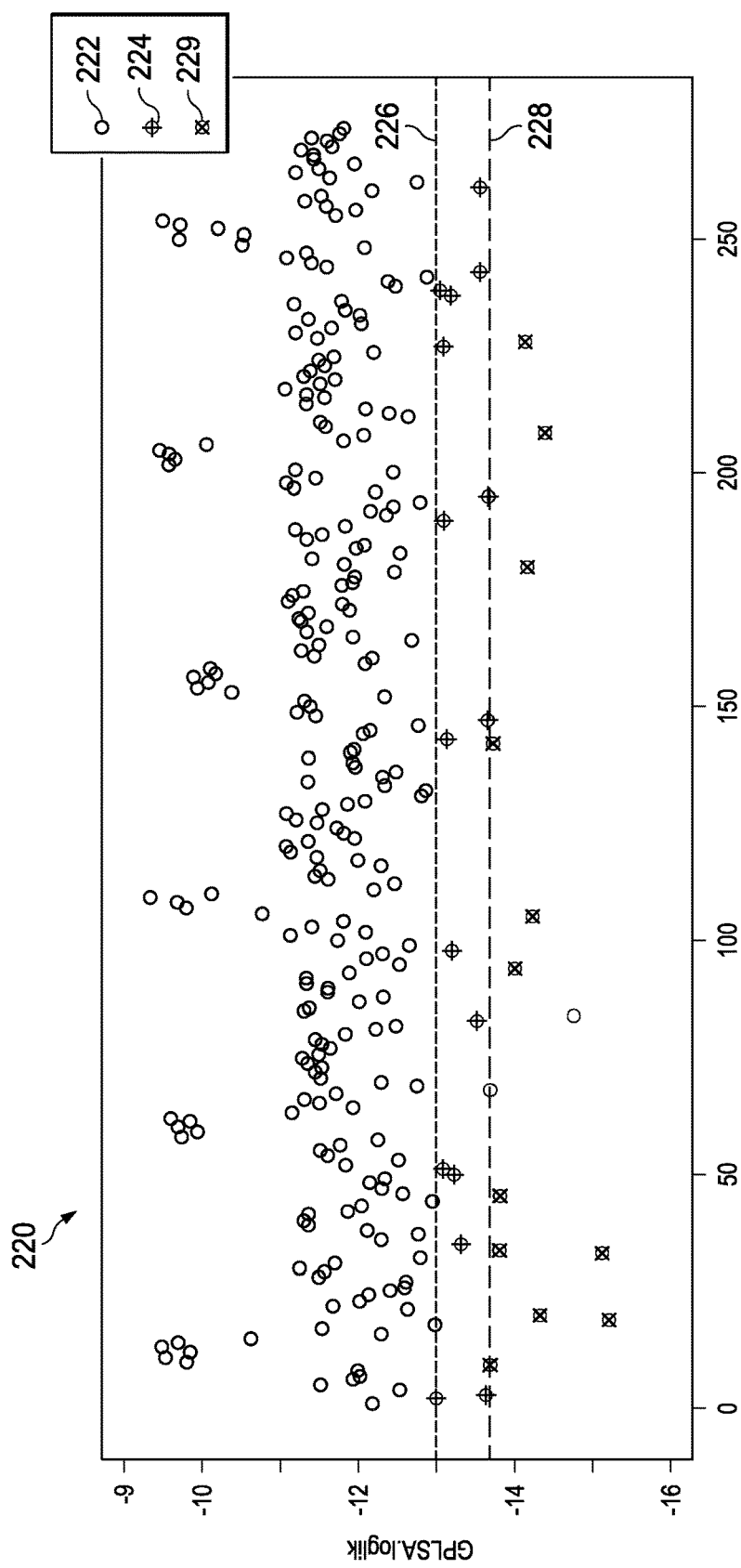
FIG. 4 illustrates an example two-dimensional data point distribution with test data.

FIG. 4 illustrates graph 220 used to detect anomalies. Graph 220 shows the GPLSA log likelihood of testing data. Points 222 above line 226 are unlikely to be anomalies, points 224 between line 226 and line 228 are somewhat likely to be anomalies, and points 229 below line 228 are highly likely to be anomalies.

Figure 5A:
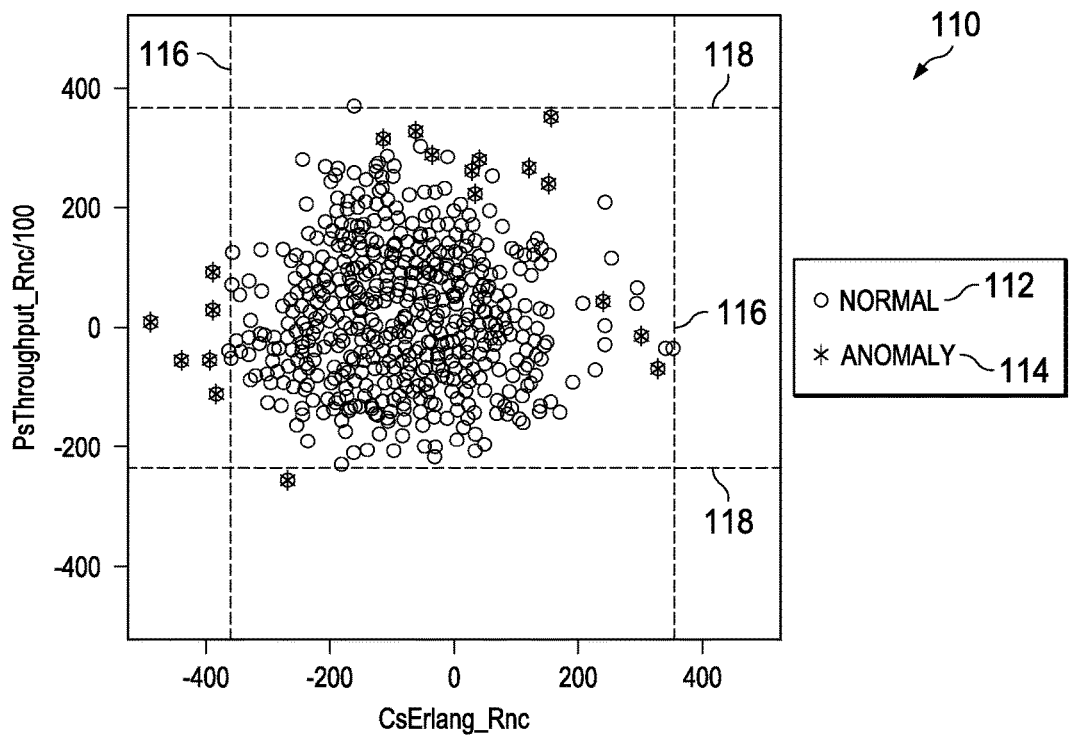
FIGS. 5a-h illustrate magnitude bounding boxes for example two-dimensional data point clusters.
Figure 5B:
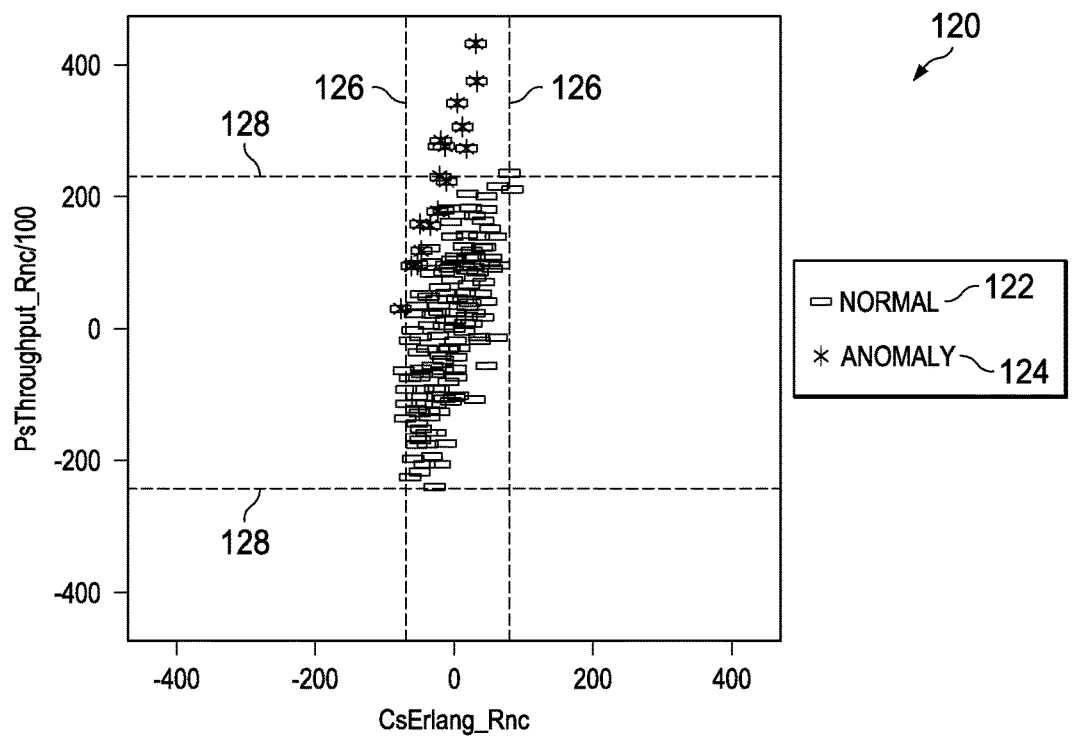
Figure 5C:
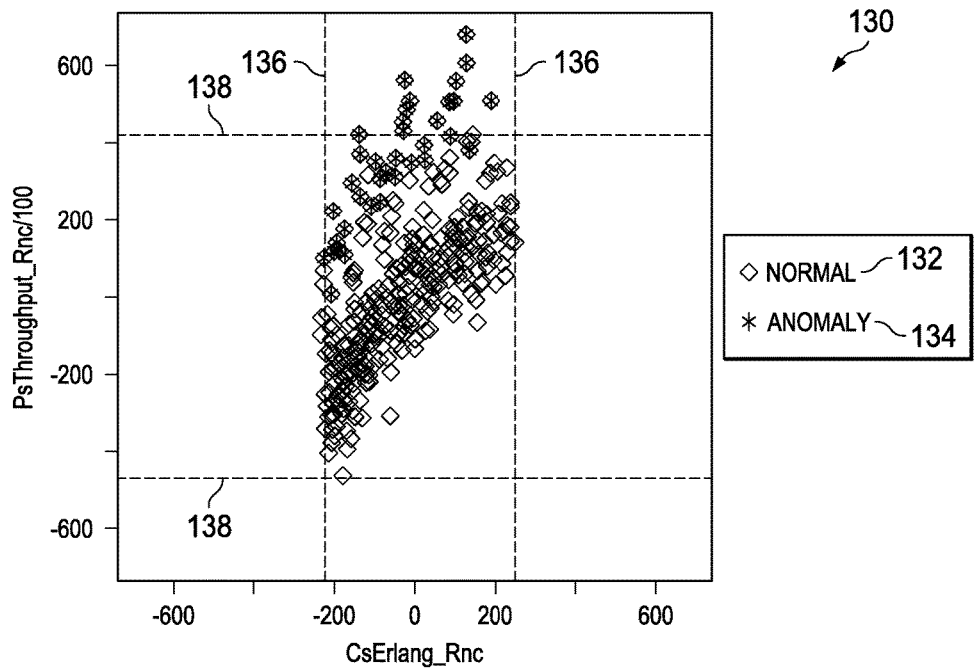
Figure 5D:
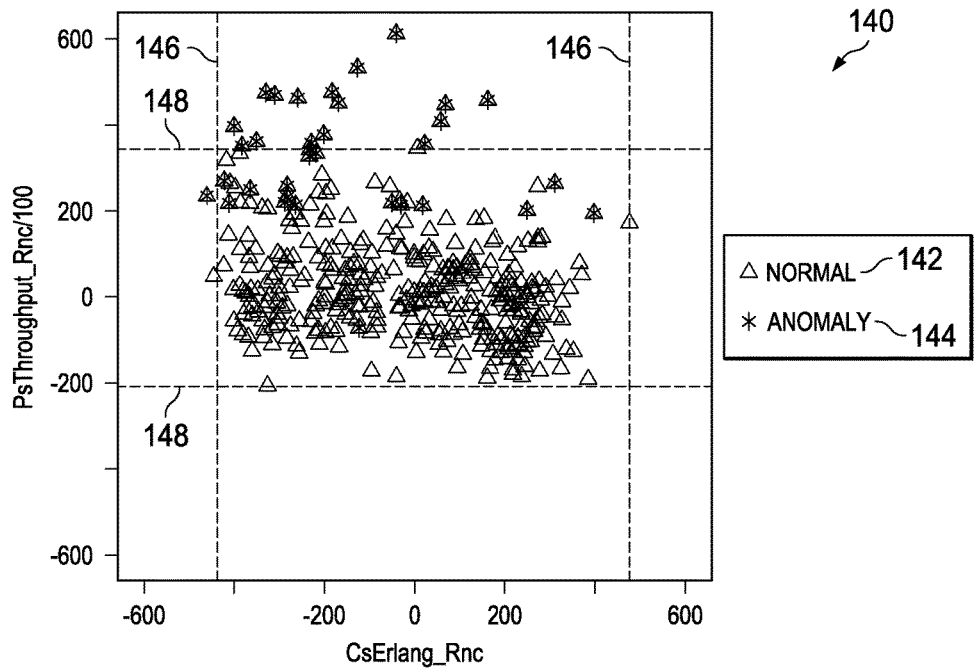
Figure 5E:
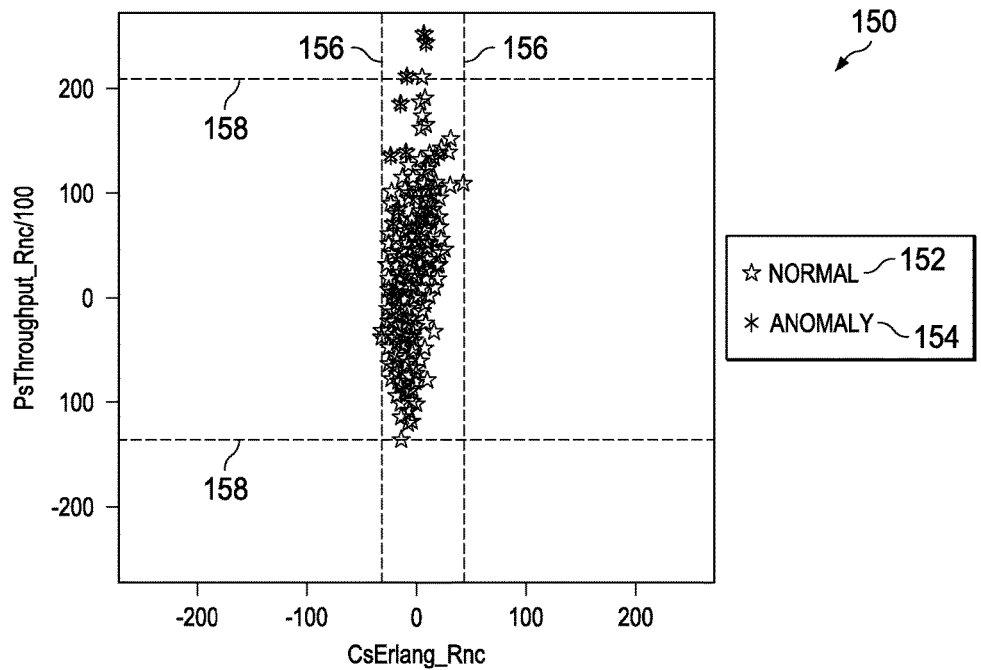
Figure 5F:
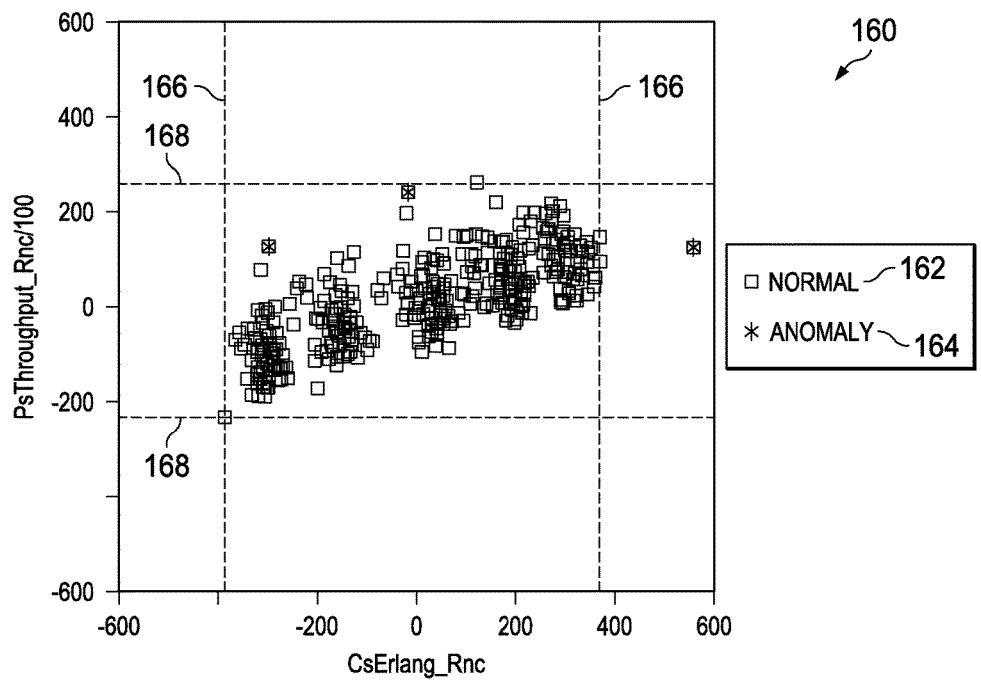
Figure 5G:
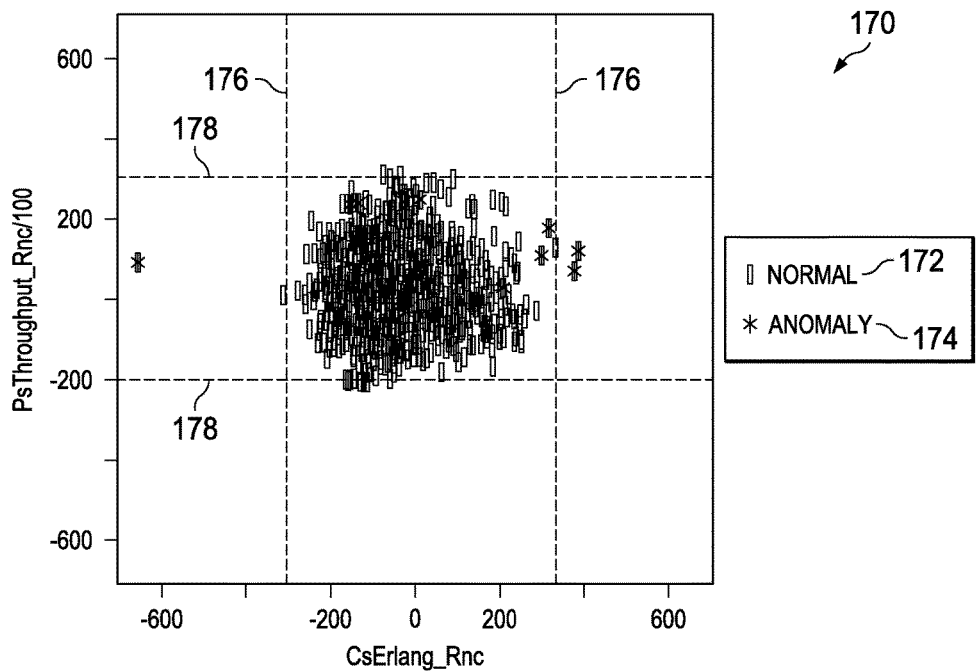
Figure 5H:
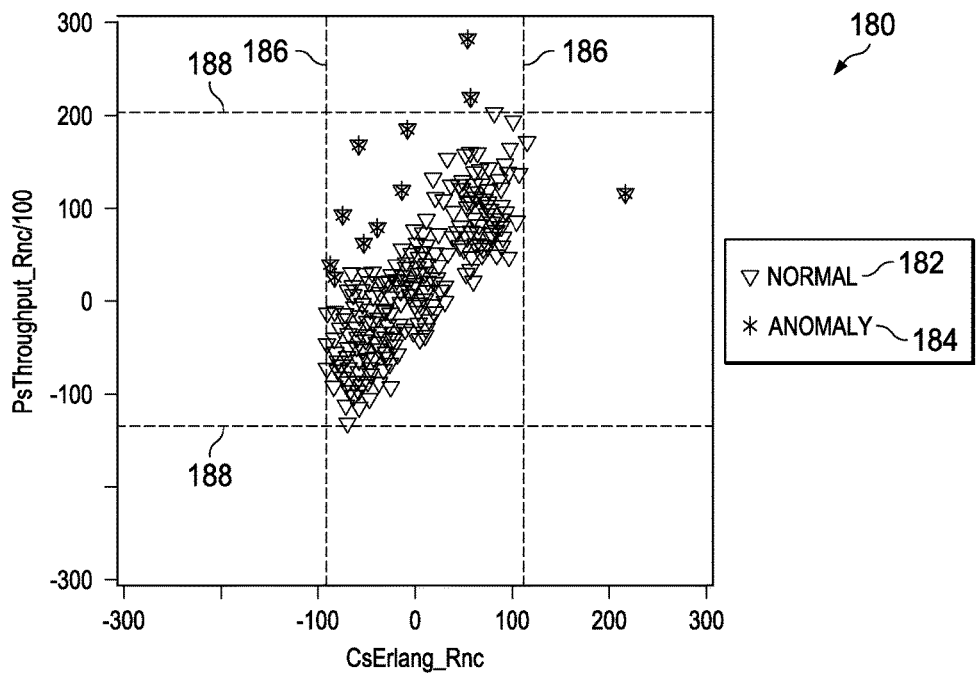

FIGS. 5a-h illustrate examples of anomaly detection using magnitude limits for individual variables. FIG. 5a illustrates graph 110 with normal data points 112, anomaly data points 114, CS limits 116 and PS limits 118. Also, FIG. 5b illustrates graph 120 with normal data points 122, anomaly data points 124, CS limits 126, and PS limits 128. Similarly, FIG. 5c illustrates graph 130 with normal data points 132, anomaly data points 134, CS limits 136, and PS limits 138. Additionally, FIG. 5d illustrates graph 140 with normal data points 142, anomaly data points 144, CS limits 146, and PS limits 148. Similarly, FIG. 5e illustrates graph 150 with normal data points 152, anomaly data points 154, CS limits 156, and PS limits 158. Also, FIG. 5f illustrates graph 160 with normal data points 162, anomaly data points 164, CS limits 166, and PS limits 168. FIG. 5g also illustrates graph 170 with normal data points 172, anomaly data points 174, CS limits 176, and PS limits 178. Additionally, FIG. 5h illustrates graph 180 with normal data points 182, anomaly data points 184, CS limits 186, and PS limits 188. As shown in FIGS. 5a-h, many anomaly data points lie within the normal magnitude limits of the individual variables. Based on metrics obtained via Eigen-analysis, such as scores and residuals, the type of anomaly may be estimated. However, there is limited information on which variables in a multi-dimensional set are involved in the anomalous behavior. Anomalies which are outside of the bounding box are type 0 anomalies, or individual magnitude anomalies. When, for any of the N projections is large, i.e. $|P_i(A')| > \varepsilon_i$, $i=1, \ldots, N$, the anomaly is an individual magnitude anomaly. Many anomalies are within the bounding box, and are unexplained anomalies.

Figure 6A:
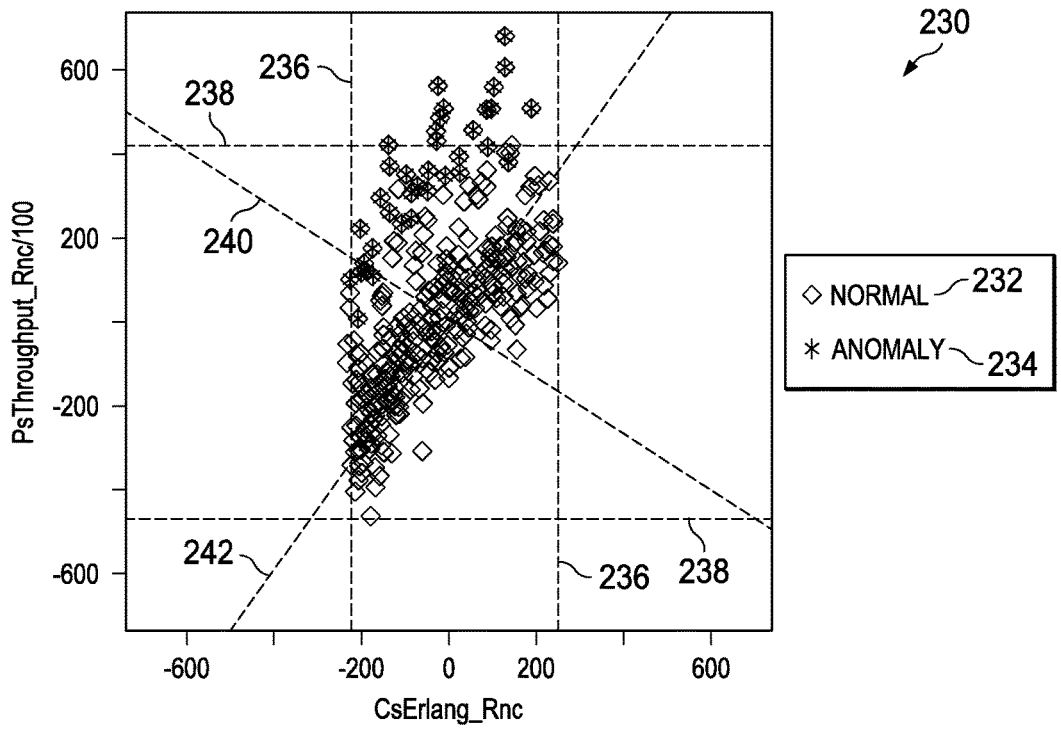
FIGS. 6a-b illustrate the construction of a two-dimensional principal component analysis (PCA) bounding box for a two dimensional data point cluster.

FIGS. 6a illustrate the construction of two different bounding boxes for anomaly root cause analysis. A magnitude bounding box and a principal component analysis (PCA) bounding box are constructed. FIG. 6a illustrates graph 230 with normal data points 232 and anomaly data points 234. In the N-dimensional space (2 dimensional in FIGS. 6*a*-*b*), projections $P_1(A'), \ldots, P_N(A')$ are defined as the projections or coordinates on each of the N orthogonal axes. For each original axis, the smallest boundary which is orthogonal to the axis and encloses all of the normal data is determined as the limit to the bounding box. An individual magnitude bounding box is constructing using CS limits 236 and PS limits 238. All of the normal data points are inside the magnitude bounding box. However, some of the anomaly data points are inside the magnitude bounding box and some of the anomaly data points are outside the magnitude bounding box.

A second bounding box is created based on a PCA or a joint magnitude based bounding box. All of the anomaly data points are outside of the PCA bounding box. Some normal data points are inside the PCA bounding box and some normal data points are outside the PCA data points. In the N-dimensional principal component (PC) space, $PC_1(A'), \ldots PC_N(A')$ is defined as the new linear combinations of the original variables. The PC space contains eigenvectors which are linear combinations of the original variables. In FIG. 6*a*, line 242 and line 240 are the eigenvectors. The eigenvector corresponding to the large eigenvectors (line 242 in FIG. 6*a*) is the major eigenvector, while eigenvectors corresponding to smaller eigenvalues (line 240 in FIG. 6*a*) are minor eigenvectors. While two variables are illustrated for clarity, many more variables, for example 300 or more, may be used in PC analysis.

Figure 6B:
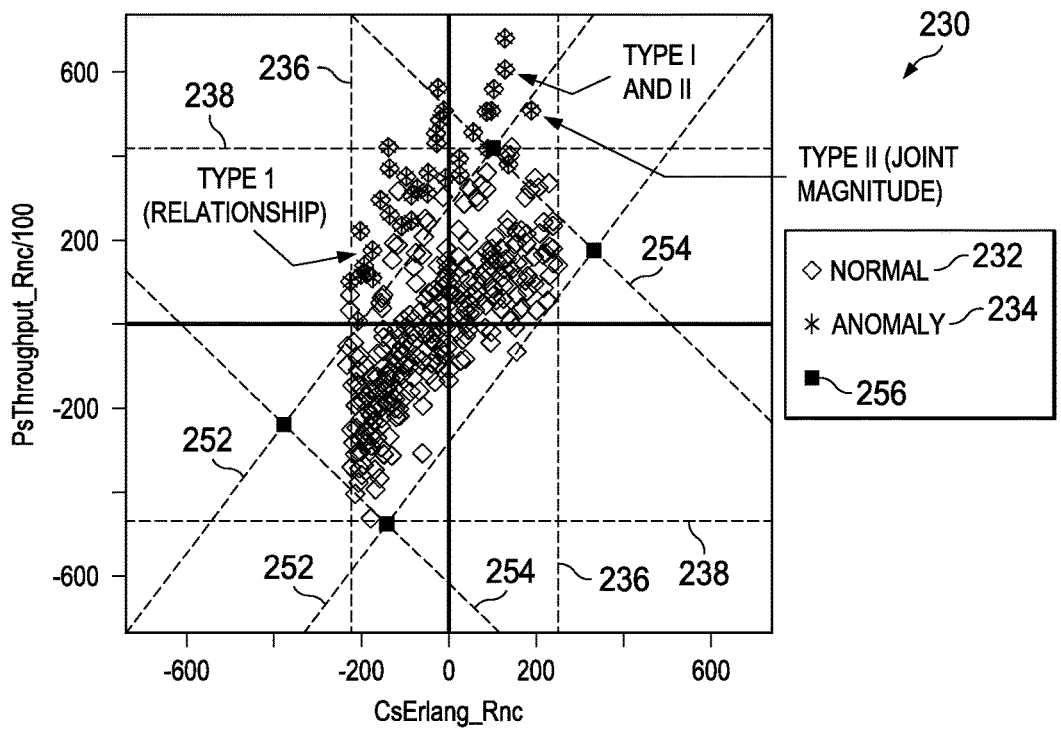

In FIG. 6*b*, the PCA bounding box is constructed, with major limits 254 and minor limits 252. Points 256 depict the limits of the PCA bounding box, which are formed so all of the anomaly data points are outside the PCA bounding box. Anomaly data points which are inside the magnitude bounding box and outside the PCA bounding box are type 1, or relationship type anomalies, where the individual magnitude of any single variable are normal, but the relationship between the values of different variables is anomalous. Anomaly data points which are outside both bounding boxes, but between major limits, for example lines 252, are type II, or joint magnitude anomalies, where the value(s) of at least one variable are outside the normal limits, but the relationship between the variables is normal. Anomaly data points which are outside both bounding boxes and not between the limit lines are both type I and II anomalies, where at least one variable has a value outside the normal range and the relationship between variables is atypical.

When an anomaly is detected, the anomaly associated with a particular cluster. The most likely cluster index or hidden mode may be found using a hard clustering technique. In hard clustering, data is divided into distinct clusters, where each data element belongs to exactly one cluster. Data points may be assigned to a cluster based on which cluster they are closest to, or based on additional information, such as metadata indicating which cluster the data point should belong to. In one example, the most likely cluster corresponding to the given anomaly data point (A) is given by:

$$H = \arg\max\{P(\text{cluster id}|A)\},$$

which considers the cell or time specific prior probability of the cluster. In another example, a cluster is selected to maximize the likelihood that the anomaly belongs to that cluster, for example using:

$$H = \arg\max\{p(A|\text{cluster id})\}.$$

The data points in the cluster are standardized. For a given anomaly data point A, according to the cluster H, the standardized data point is given by:

$$A' = \frac{A - \text{mean}(\text{ClusterH})}{\text{sd}(\text{ClusterH})},$$

where ClusterH is the center of the cluster. The scale is adjusted to remove the impact of the units, and the axes are equalized.

An individual magnitude bounding box is formed, which is the smallest hyper-rectangle in the standardized data vector space that includes all normal data points for each cluster.

A PCA, relationship, or joint magnitude based bounding box is determined, which is the largest hyper-rectangle that excludes all historical and current anomalies for each data cluster. The PCA bounding box is oriented along principal component or eigenvector directions. The PCA bounding box may be enclosed by the magnitude based bounding box. Eigenvalue decomposition of the standardized covariance matrix for Eigen-decomposition may be done to construct the PCA bounding box. The principal eigenvectors PC(1), . . . , PC(N) are determined, where PC(1) is the eigenvector corresponding to the largest eigenvalue and PC(N) is the eigenvector corresponding to the smallest eigenvalue. The PC variables may be expressed as linear combinations of the original variables.

An anomaly is classified based on where it lies relative to the bounding boxes. An anomaly data point is determined to be an individual magnitude anomaly and/or a joint magnitude anomaly. The values of the PC variables of the standardized anomaly data point A' are determined to construct the PCA bounding box.

The first order N eigenvalues from PCA in each of the N-dimensional standardized are determined, where the eigenvalues are ordered from smallest to largest:

$$\lambda 1 \leq \ldots \leq \lambda n \leq Th \leq \ldots \leq \lambda N.$$

Th is a threshold, which may be 1, or another appropriate value.

The space is decomposed into two mutually orthogonal hyper sub-spaces. One space is spanned by the cluster's sub-dominant PC variables $\{PC(1), \ldots, PC(n)\}$ with eigenvalues less than 1, and the other dominant PC variables $\{PC(n+1), \ldots, PC(N)\}$ with eigenvalues greater than 1.

When the sub-dominant PCA components of the anomaly data point A lies far from the origin in the space spanned by $\{PC(1), \ldots, PC(n)\}$, then some relationship among the original variables has broken down. This is known as a type I or joint anomaly, and is the most common type of anomaly. $PC_1(A'), \ldots, PC_n(A')$ is the sub-dominant PC values of A, i.e. the projection of the standardized A' onto the sub-dominant PC dimensions PC(1, . . . , PC(n). When a projection is very large, for example $|PC_i(A')| > \varepsilon_i$ for i in $\{1, \ldots, n\}$, then the relationship breaks down among the original variables of A'. When all projections onto the sub-dominant PC-dimensions are satisfied, i.e., $|PC_i(A')| \leq \varepsilon_i$ for all i in $\{1, \ldots, n\}$, then no relationship breaks down. $\varepsilon i$ is obtained from constructing the PCA bounding box. Most relational anomalies occur along a minor axis.

When the dominant PCA components of the anomaly data point A' lie significantly far from the origin in the space spanned by $\{PC(n+1), \ldots, PC(N)\}$, the anomaly is a type II or PCA joint magnitude anomaly, and an extreme joint magnitude among the original variables has occurred. $PCn+1(A'), \ldots, PCN(A')$ are the dominant PC values of A', i.e. the projection of the standardized A onto the dominant PC dimensions PC(n+1), . . . , PC(N). When any of the projections are very large, for example $|PC_i(A')|>\varepsilon_i$ for an i in $\{n+1, \ldots, N\}$, then an extreme joint magnitude occurs among the original variables of A'. When all projections onto the dominant PC-dimensions are satisfied, i.e. $|PC_i(A')|\leq\varepsilon_i$ for all i in $\{n+1, \ldots, N\}$, then no extreme joint magnitude occurs among the original variables of A'. $\varepsilon_i$ is obtained by the PCA based bounding box. An anomaly may be type I, type II, or both type I and type II.

The subset of variables likely involved in the anomaly may be determined based on the box boundary or hyperplane surface closest to the anomaly. $PC_i(A')$ is a linear combination of the original variables $(X_1, \ldots, X_m)$ obtained from PCA. If the anomaly is a PCA type anomaly, based on the identity i of the PC dimensions of A' that fall outside of the bounding box and violate the corresponding inequality, the original variables are evaluated for the PCA relationship breakdown or extreme joint magnitude to assist in RCA.

Figure 7A:
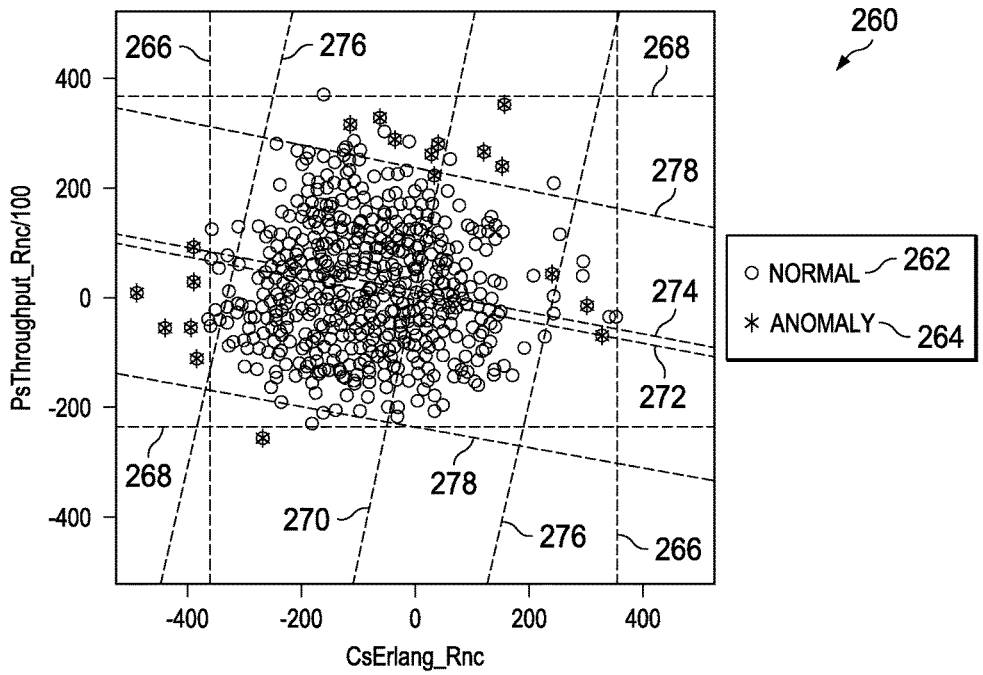
FIGS. 7a-g illustrate magnitude bounding boxes and PCA bounding boxes for two dimensional data point clusters.

FIGS. 7a-g illustrate magnitude and PCA bounding boxes for several example clusters. FIG. 7a illustrates graph 260 for a cluster with normal data points 262 and anomaly data points 264. Lines 266 and 268 form a magnitude bounding box. Line 272 shows the major eigenvector and line 270 shows the minor eigenvector. A PCA bounding box is formed by lines 278 and lines 276.

Figure 7B:
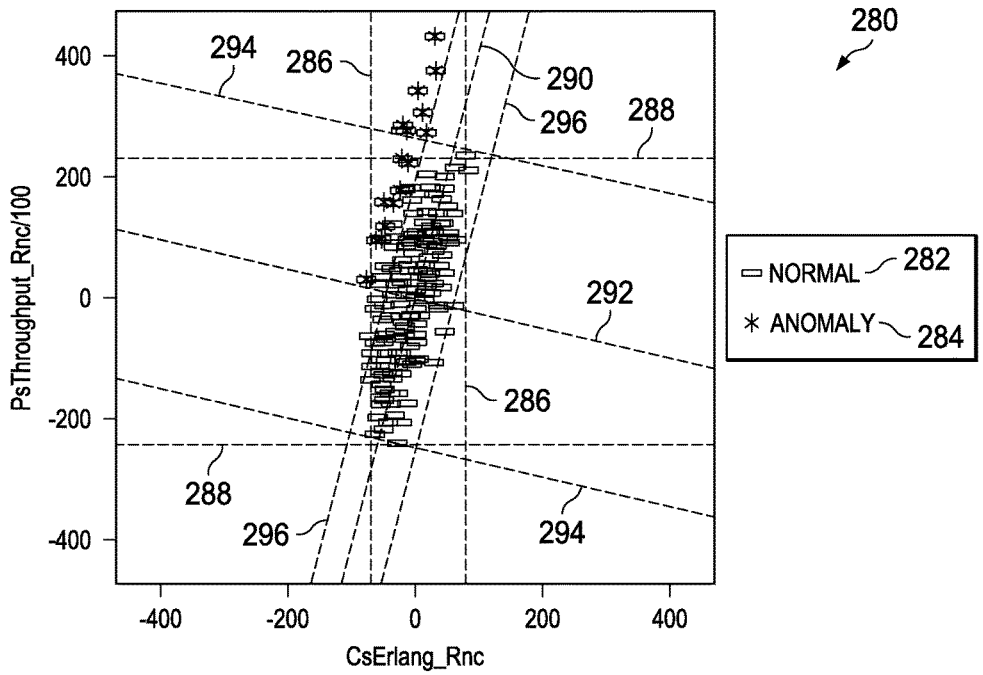

FIG. 7b illustrates graph 280 with normal data points 282 and anomaly data points 284. A magnitude bounding box is formed by lines 288 and lines 286. Line 290 illustrates the major eigenvector while line 292 indicates the minor eigenvector, and a PCA bounding box is formed from lines 294 and lines 296.

Figure 7C:
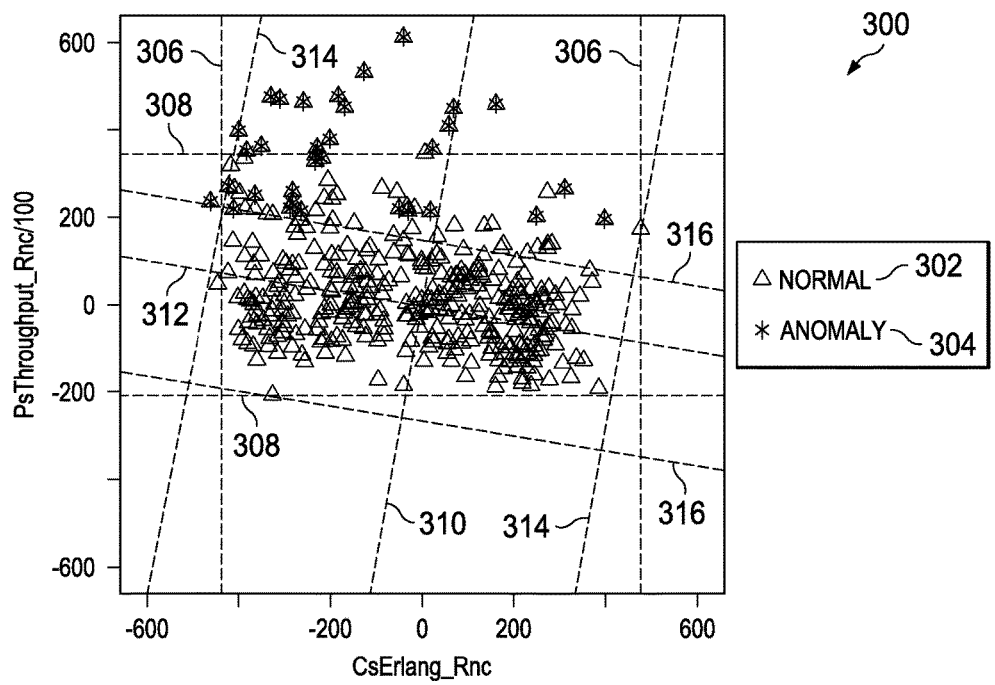

FIG. 7c illustrates graph 300 with normal data points 302 and anomaly data points 304. A magnitude bounding box is formed by lines 308 and lines 306. Line 312 shows the major eigenvector and line 310 shows the minor eigenvector, and a PCA bounding box is formed by lines 314 and lines 316.

Figure 7D:
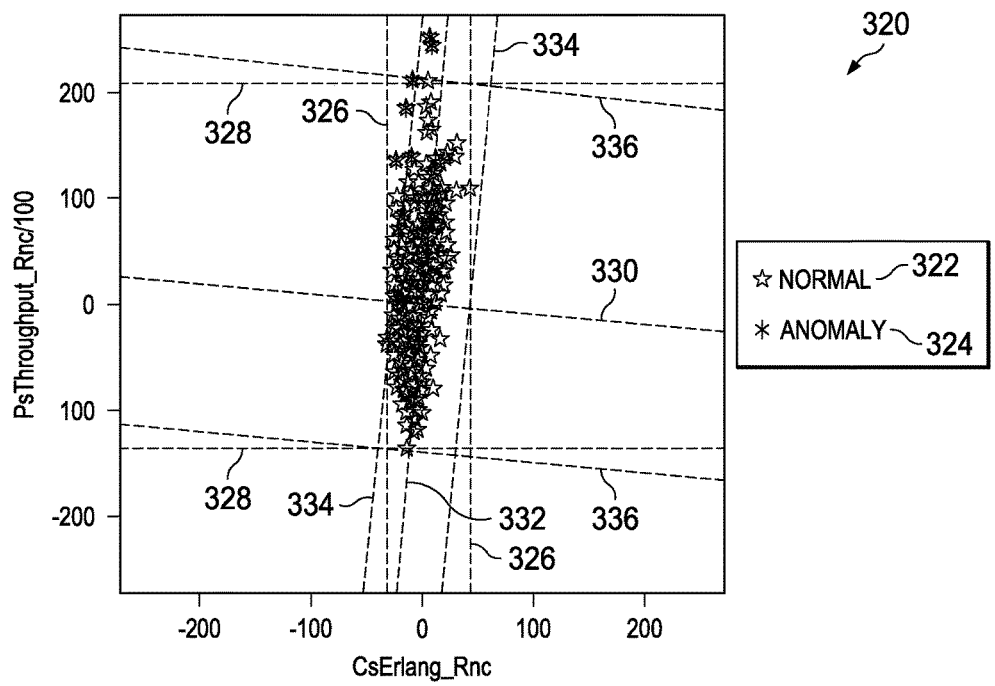

FIG. 7d illustrates graph 320 with normal data points 322 and anomaly data points 324. A magnitude bounding box is formed by lines 328 and lines 326. Line 332 shows the major eigenvector and line 330 shows the minor eigenvector, and a PCA bounding box is formed by lines 334 and lines 336.

Figure 7E:
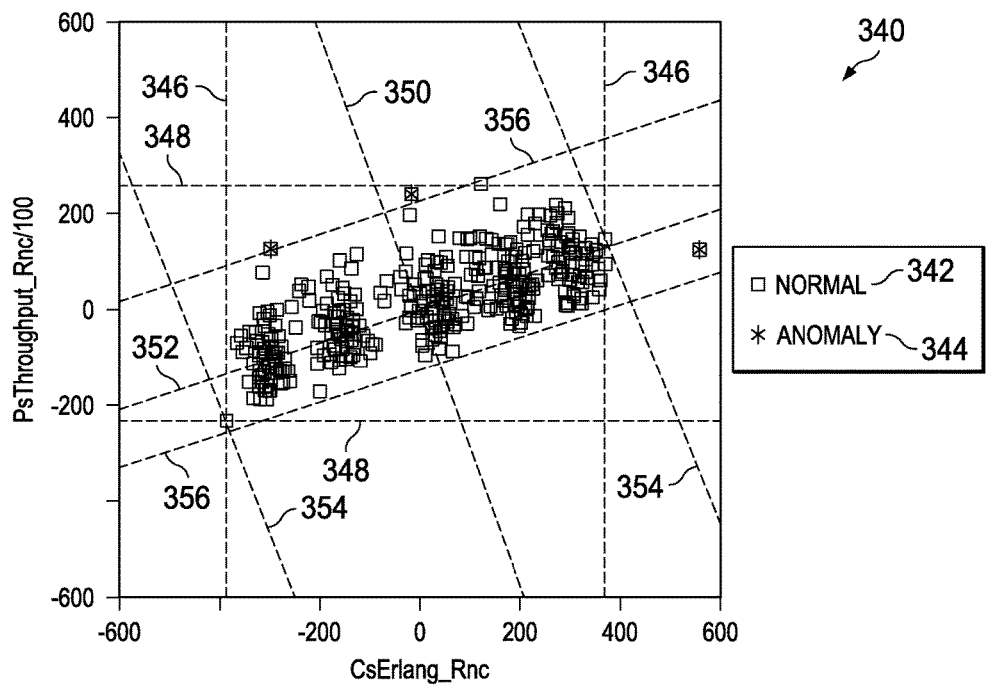

FIG. 7e illustrates graph 340 with normal data points 342 and anomaly data points 344. A magnitude bounding box is formed by lines 346 and lines 348. Line 352 shows the major eigenvector and line 350 shows the minor eigenvector, and a PCA bounding box is formed by lines 356 and lines 354.

Figure 7F:
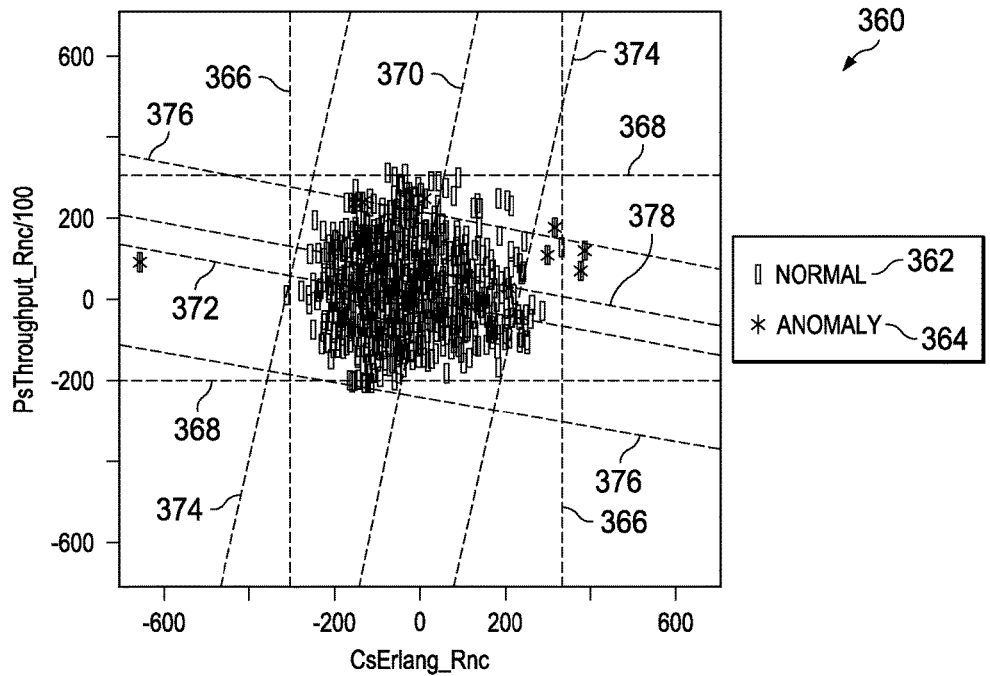

FIG. 7f illustrates graph 360 with normal data points 362 and anomaly data points 364. A normal bounding box is formed by lines 366 and lines 368. Line 372 shows the major eigenvector and line 370 shows the minor eigenvector, and a PCA bounding box is formed from lines 374 and lines 376.

Figure 7G:
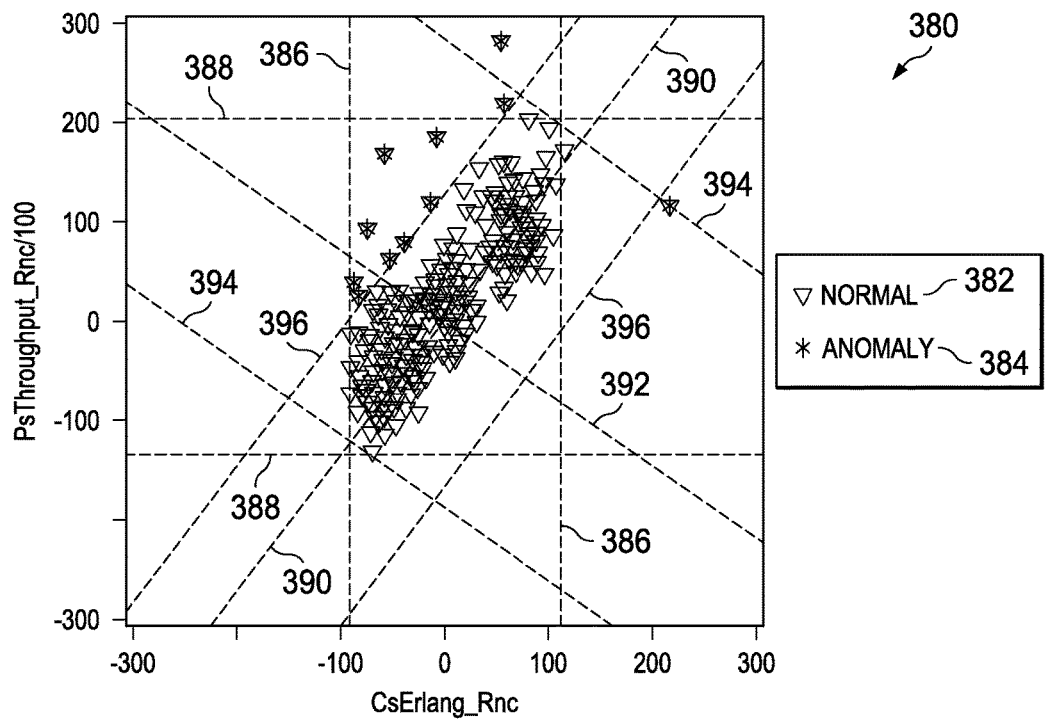

FIG. 7g illustrates graph 380 with normal data points 382 and anomaly data points 384. A magnitude bounding box is formed by lines 388 and lines 386. Line 390 shows the major eigenvector and line 392 shows the minor eigenvector. Also, a PCA bounding box is formed by lines 396 and lines 394.

Figure 8:
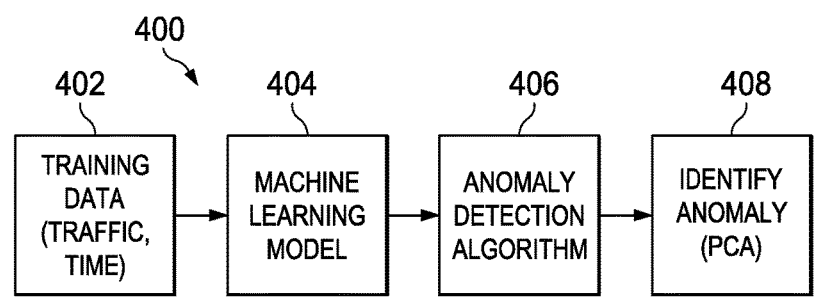
FIG. 8 illustrates a flowchart of an embodiment method of PCA root cause analysis.

FIG. 8 illustrates flowchart 400 for an embodiment method of PCA based root cause analysis. Initially, in step 402, the system receives training data. The training data may be received for traffic over time RNC. In one example, the training data is training data for data in a network from one or more RNC. The data may have many variables, for example 300 or more variables, which affect the data set.

Next, in step 404, a machine learning model is used to classify anomalies from the training data. Example techniques include density based techniques, subspace and correlation based outlier detection for high-dimensional data, one class support vector machines, replicator neural networks, cluster analysis based outlier detection, deviations from association rules and frequent itemsets, fuzzy logic based outlier detection, and ensemble techniques using feature bagging, score normalization, and different sources of diversity. Also, hard detection of clusters may be performed based on the training data. The data set may be divided into multiple normal clusters.

Then, in step 406, an anomaly detection algorithm is determined based on the machine learning model from step 404. For example, a GPLSA log likelihood of testing data may be used to detect anomalies.

In step 408, anomalies are classified using PCA root cause analysis. Both a magnitude bounding box and a PCA bounding box are constructed around a cluster. Anomalies are classified based on where they lie in relative to the bounding boxes. The magnitude bounding box is constructed to include all of the normal data points. To determine the PCA bounding box, eigenvectors of the data set are determined, which are linear combinations of the original variables. Along the eigenvector axes, a PCA bounding box is constructed with limits parallel to the eigenvectors, where all anomaly data points are outside the PCA bounding box. When an anomaly data point is outside the magnitude bounding box but within the PCA bounding box limits, it is classified as a magnitude type anomaly. On the other hand, when an anomaly data point is inside the magnitude bounding box and outside the major PCA limits, it is classified as a joint anomaly. When an anomaly is outside the magnitude bounding box and outside the major PCA bounding box lines, it is classified as both a magnitude anomaly and a joint anomaly. Also, the relevant variables may be detected.

Figure 9:
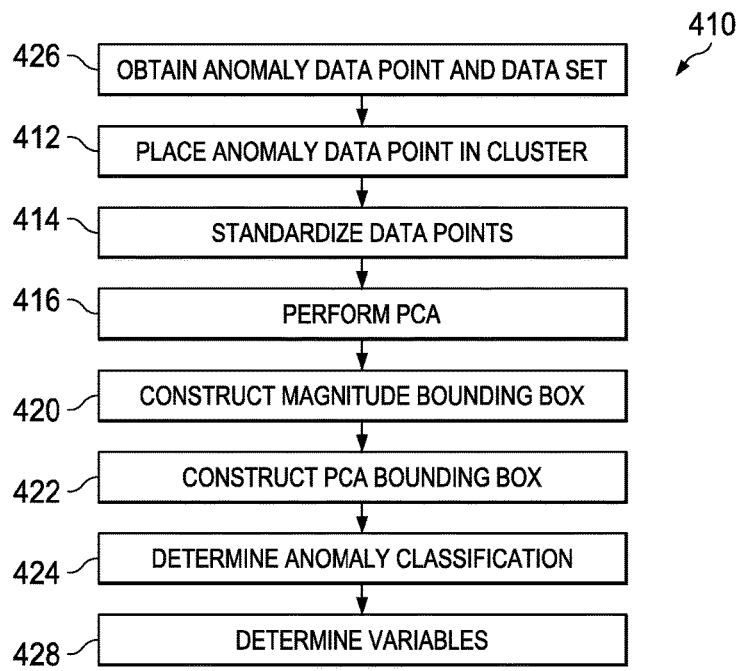
FIG. 9 illustrates a flowchart of another embodiment method of PCA root cause analysis.

FIG. 9 illustrates flowchart 410 for an embodiment method of PCA anomaly root cause analysis. Initially, in step 426, the system obtains an anomaly data point and a data point distribution. The data may be received from a network, for example from an RNC. The data point distribution may include multiple clusters of normal data, along with anomaly data points. There may be many variables in the data set, for example 300 or more variables. The anomaly data point may be an anomaly which has been detected, for example using a machine learning model.

Then, in step 412, the system allocates a cluster to the anomaly data point. This may be done using hard cluster analysis, where each anomaly is placed in one cluster. In one example, the anomaly data point is placed in the closest cluster. In another example a likelihood score is calculated for each cluster, where the likelihood score indicates the likelihood that the anomaly data point belongs to a particular cluster. Additional information, such as metadata, may be used to allocate the anomaly data point to a cluster. For example, the season or time of day may be used to place then anomaly data point in a cluster. In one example, the most likely cluster or hard cluster corresponding to the given anomaly data point (A) is given by:

$$H=\arg\max\{P(\text{cluster id}|A)\},$$

which considers the cell or time specific prior probability of the cluster. In another example, a cluster is selected to maximize the likelihood of the anomaly, for example using:

$$H=\arg\max\{p(A|\text{cluster id})\}.$$

Next, in step 414, the data points in a cluster are standardized. This is performed to remove the effect of the scales of the variables. For a given anomaly data point A, according to the cluster H, the standardized data point is given by:

$$A' = \frac{A - \text{mean}(ClusterH)}{sd(ClusterH)}.$$

In step 416, PCA is performed on the anomaly data point in a cluster. The eigenvectors and eigenvalues are determined, where an eigenvalue corresponds to each eigenvector. The eigenvectors are linear combinations of the original variables.

In step 420, a magnitude bounding box is constructed for the cluster using the original axes so all of the normal data points are within the magnitude bounding box. In N dimensional space, projections are defined as the coordinates of each of the N orthogonal axes. The smallest hyper-rectangle which is orthogonal to the axes and enclose all of the normal data is used as the bounding box. The magnitude bounding box may be visualized in two dimensions, but many more dimensions may be used.

In step 422, a PCA bounding box is constructed, so all of the anomaly data points are outside the PCA bounding box. An N-dimensional PC space is defined as a linear combination of the original variables as eigenvectors. The eigenvalues corresponding to the eigenvectors are placed in order to smallest to largest. A threshold, for example 1, is set, where PC variables corresponding to eigenvalues below the threshold are classified as sub-dominant PC variables and variables greater than or equal to the threshold are dominant PC variables.

Next, in step 424, anomaly classification is performed. The anomaly is classified based on its orientation relative to the magnitude bounding box and the PCA bounding box. Anomaly data points inside the magnitude bounding box and outside the PCA limits are classified as relationship type anomalies. Anomaly data points which are outside the magnitude bounding box but within the major PCA limits are joint magnitude anomalies. Anomaly data points which are outside the magnitude bounding box and outside the major PCA limits are both magnitude and relationship type anomalies. When the sub-dominant PCA components of an anomaly data point lie far from the origin, then there is a relationship type anomaly. When the dominant PC components of the anomaly data point lie significantly from the origin, the anomaly is a magnitude type anomaly.

Finally, in step 428, the variables related to the anomaly are determined, which may be a subset of the total variables. The determined variables may be used to address the anomaly.

In an embodiment bounding box based root cause analysis, PCA is applied for root cause analysis of anomalies, where anomalies are explained based on a relationship and/or joint magnitude scale. An anomaly may be labeled as being due to a relationship breakdown and/or due to extreme joint magnitude of some or all of the original variables. It is also determined whether the anomaly is due to extreme individual magnitude of some or all of the original variables. For PCA type anomalies, the specific linear combinations of the original variables may be used to determine the root cause of the anomaly. The original variables in a multi-dimensional set involved in the anomaly are determined, which may lead to corrective action or compensation.

Figure 10:
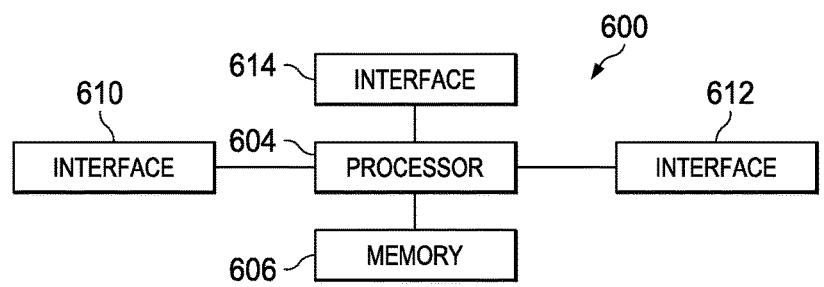
FIG. 10 illustrates a block diagram of an embodiment processing system.

FIG. 10 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 10. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 10, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
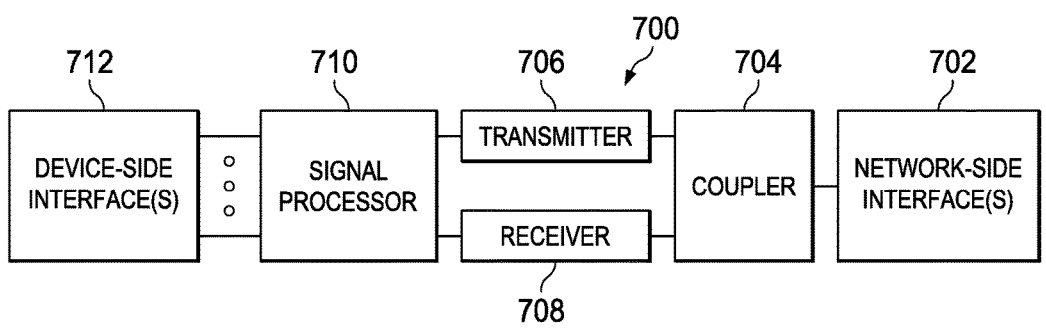
FIG. 11 illustrates a block diagram of an embodiment a transceiver.

In some embodiments, one or more of the interfaces 610, 612, 614 connects the processing system 600 to a transceiver adapted to transmit and receive signaling over the telecommunications network. FIG. 11 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
receiving, by a processor from a radio network controller (RNC) of a network, one of a first anomaly data point, a second anomaly data point, and a third anomaly data point, the first, second, and third anomaly data points being related to a plurality of variables;
classifying, by the processor in response to receiving the first anomaly data point, the first anomaly data point as a relationship type anomaly, upon determining that the first anomaly data point is inside a magnitude bounding box and outside a principal component analysis (PCA) bounding box, wherein the PCA bounding box excludes all of a plurality of anomaly data points of a data set, and limits of the PCA bounding box are orthogonal to eigenvectors of the data set;
classifying, by the processor in response to receiving the second anomaly data point, the second anomaly data point as a joint magnitude anomaly, upon determining that the second anomaly data point is outside the magnitude bounding box, outside the PCA bounding box, and between major limits of the PCA bounding box;
classifying, by the processor in response to receiving the third anomaly data point, the third anomaly data point as both the relationship type anomaly and the joint magnitude anomaly, upon determining that the third anomaly data point is outside the magnitude bounding box, outside the PCA bounding box, and not between the major limits of the PCA bounding box;
determining, in response to classifying the first anomaly data point as the relationship type anomaly, at least a first subset of the variables related to the classified first anomaly data point;
performing, by the processor based on classifying the first anomaly data point as the relationship type anomaly, corrective action on the network in accordance with the classified first anomaly data point and the at least a first subset of the variables related to the classified first anomaly data point;
determining, in response to classifying the second anomaly data point as the joint magnitude anomaly, at least a second subset of the variables related to the classified second anomaly data point;
performing, by the processor based on classifying the second anomaly data point as the joint magnitude anomaly, corrective action on the network in accordance with the classified second anomaly data point and the at least a second subset of the variables related to the classified second anomaly data point;
determining, in response to classifying the third anomaly data point as both the relationship type anomaly and the joint magnitude anomaly, at least a third subset of the variables related to the classified third anomaly data point; and
performing, by the processor based on classifying the third anomaly data point as both the relationship type anomaly and the joint magnitude anomaly, corrective action on the network in accordance with the classified third anomaly data point and the at least a third subset of the variables related to the classified third anomaly data point.

2. The method of claim 1, wherein variables of the at least a first subset of variables are relevant to the anomaly data point.

3. The method of claim 1, wherein variables of the at least a first subset of variables include one or more of magnitude type variables, joint type variables, or variables which are both magnitude type variables and joint type variables.

4. The method of claim 1, wherein the data set comprises a plurality of normal data points and a plurality of anomaly data points, wherein the magnitude bounding box contains all of the plurality of normal data points, and wherein limits of the magnitude bounding box are perpendicular to axes of variables of the data set.

5. The method of claim 1, further comprising associating the first anomaly data point with a cluster of a plurality of clusters of the data set.

6. The method of claim 5, wherein associating the first anomaly data point with the cluster of the plurality of clusters of the data set comprises performing hard clustering.

7. The method of claim 5, wherein associating the first anomaly data point with the cluster of the plurality of clusters of the data set is performed in accordance with metadata.

8. The method of claim 1, wherein obtaining the first anomaly data point comprises detecting the first anomaly data point.

9. The method of claim 1, wherein the plurality of variables comprises at least 300 variables.

10. The method of claim 1, wherein each of the first, second, and third anomaly data points is a circuit switched (CS) value for an amount of voice traffic or a packet switched (PS) value for a number of packets in the network.

11. The method of claim 1, wherein determining the at least a first subset of the variables related to the classified first anomaly data point comprises determining original variables for the classified first anomaly data point.

12. A method comprising:
receiving, by a processor from a radio network controller (RNC) of a network, a data set, wherein the data set comprises a plurality of normal data points and a plurality of anomaly data points, wherein the data set comprises a plurality of variables;
constructing, by the processor, a magnitude bounding box in accordance with the data set;
constructing, by the processor, a principal component analysis (PCA) bounding box in accordance with the data set, wherein constructing the PCA bounding box comprises:
determining a plurality of eigenvectors of the data set;
determining a plurality of eigenvalues of the data set corresponding to the plurality of eigenvectors; and
determining a plurality of pairs of limits, wherein a pair of limits is orthogonal to an eigenvector;
receiving, by the processor from the RNC, an anomaly data point;
classifying, by the processor, the anomaly data point as a relationship type anomaly, upon determining that the anomaly data point is inside the magnitude bounding box and outside the PCA bounding box;
determining a subset of the plurality of variables that are related to the classified anomaly data point; and
performing, by the processor, corrective action on the network, in accordance with the classified anomaly data point and the subset of the plurality of variables that are related to the classified anomaly data point.

13. The method of claim 12, wherein constructing the magnitude bounding box comprises constructing a plurality of orthogonal boundaries, wherein the orthogonal boundaries are orthogonal to variables of the data set, and wherein the magnitude bounding box encloses all of the plurality of normal data points.

14. The method of claim 12, further comprising:
ordering the plurality of eigenvalues;
comparing an eigenvalue of the plurality of eigenvalues to a threshold;
determining that an eigenvector of the plurality of eigenvectors corresponding to the eigenvalue is a sub-dominant variable when the eigenvalue is less than the threshold; and
determining that the eigenvector is a dominant eigenvector when the eigenvalue is greater than or equal to the threshold.

15. The method of claim 12, wherein the PCA bounding box excludes all of the plurality of anomaly data points.

16. The method of claim 12, further comprising dividing the data set into a plurality of clusters.

17. The method of claim 16, further comprising standardizing data points of a cluster of the plurality of clusters.

18. A computer comprising:
a processor; and
a non-transitory computer readable storage medium storing programming for execution by the processor, the programming including instructions to:
receive, from a radio network controller (RNC) of a network, an anomaly data point, the anomaly data point related to a plurality of variables,
classify the anomaly data point as a relationship type anomaly, upon determining that the anomaly data point is inside a magnitude bounding box and outside a principal component analysis (PCA) bounding box, wherein the PCA bounding box excludes all of a plurality of anomaly data points of a data set, and limits of the PCA bounding box are orthogonal to eigenvectors of the data set,
classify the anomaly data point as a joint magnitude anomaly, upon determining that the anomaly data point is outside the magnitude bounding box, outside the PCA bounding box, and between major limits of the PCA bounding box,
classify the anomaly data point as both the relationship type anomaly and the joint magnitude anomaly, upon determining that the anomaly data point is outside the magnitude bounding box, outside the PCA bounding box, and not between the major limits of the PCA bounding box,
determining at least a subset of the variables related to the classified anomaly data point; and
perform corrective action on the network in accordance with the classified anomaly data point and the at least a subset of the variables related to the classified anomaly data point.

* * * * *